(12) United States Patent
McIntosh

(10) Patent No.: US 11,981,434 B2
(45) Date of Patent: May 14, 2024

(54) WASTE DRAIN SYSTEMS AND METHODS FOR A TOILET

(71) Applicant: THE BOEING COMPANY, Chicago, IL (US)

(72) Inventor: Darren Carl McIntosh, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 240 days.

(21) Appl. No.: 17/405,436

(22) Filed: Aug. 18, 2021

(65) Prior Publication Data

US 2023/0053777 A1    Feb. 23, 2023

(51) Int. Cl.
*E03D 9/10* (2006.01)
*B64D 11/02* (2006.01)
*E03F 1/00* (2006.01)

(52) U.S. Cl.
CPC .......... *B64D 11/02* (2013.01); *E03D 9/10* (2013.01); *E03F 1/006* (2013.01)

(58) Field of Classification Search
CPC .......... B64D 11/02; E03D 9/10; E03F 1/006
USPC ............................................................. 4/300
See application file for complete search history.

(56) References Cited

U.S. PATENT DOCUMENTS

| | | | |
|---|---|---|---|
| 1,792,345 A * | 2/1931 | Williams | E03F 5/0407 285/391 |
| 3,858,813 A | 1/1975 | Hiller | |
| D421,295 S * | 2/2000 | Barnett | D23/261 |
| 7,472,435 B2 * | 1/2009 | Havens | E03C 1/284 4/DIG. 14 |
| 9,228,368 B2 * | 1/2016 | Barnett | E04H 4/14 |
| 9,487,940 B2 * | 11/2016 | Shair | E03D 11/11 |
| 9,529,943 B2 * | 12/2016 | Beck | G06F 30/00 |
| 11,235,997 B2 * | 2/2022 | Aggarwal | C02F 1/001 |
| 11,519,162 B1 * | 12/2022 | Amendariz | E03D 11/16 |
| 2007/0143909 A1 | 6/2007 | Montgomery | |

FOREIGN PATENT DOCUMENTS

| | | |
|---|---|---|
| CN | 109339181 | 2/2019 |
| KR | 20150126740 | 11/2015 |
| WO | WO 2007/094399 | 8/2007 |

OTHER PUBLICATIONS

Extended European Search Report for EP 22190297-6-1004, dated Dec. 23, 2022.

* cited by examiner

*Primary Examiner* — Huyen D Le
(74) *Attorney, Agent, or Firm* — Joseph M. Butscher; The Small Patent Law Group LLC

(57) ABSTRACT

A waste drain system is configured to be coupled to a toilet. The waste drain system includes a conduit including a main body defining an internal passage having a central longitudinal axis, and one or more cutting blades extending from the main body toward the central longitudinal axis. The one or more cutting blades are configured to cut one or more items that pass through the internal passage.

20 Claims, 8 Drawing Sheets

WASTE DRAIN SYSTEMS AND METHODS FOR A TOILET

FIELD OF THE DISCLOSURE

Embodiments of the present disclosure generally relate to waste drain systems and methods for a toilet, such as can be used in relation to a lavatory within an internal cabin of a commercial aircraft.

BACKGROUND OF THE DISCLOSURE

Commercial aircraft are used to transport passengers between various locations. A typical commercial aircraft includes one or more lavatories within an internal cabin.

As can be appreciated, a clogged or otherwise blocked toilet within an internal cabin of an aircraft can disrupt a flight schedule. Further, fixing such clogs or blocks is time, labor, and cost intensive.

A blocked toilet during a flight can prevent use of the lavatory during a flight, disrupt surface, or even force the flight to be diverted. As an example, a blocked toilet can result in a delayed turnaround of a flight, and maintenance crews may be called to attempt to clear the blockage at a gate using specialized equipment. If such an effort does not succeed in clearing the blockage, the aircraft may be taken out of service for several days, and a deeper disassembly of the toilet drain system may be required to locate and clear the blockage. Example of items that can potentially cause blockages include large wads of paper towels, motion sickness bags, baby diapers and sanitary napkins.

SUMMARY OF THE DISCLOSURE

A need exists for a system and a method for reducing a risk of waste drain blockages. Further, a need exists for a system and a method that reduce a possibility of a toilet blockage disrupting a flight of a commercial aircraft, for example.

With those needs in mind, certain embodiments of the present disclosure provide a waste drain system configured to be coupled to a toilet. The waste drain system includes a conduit including a main body defining an internal passage having a central longitudinal axis, and one or more cutting blades extending from the main body toward the central longitudinal axis. The one or more cutting blades are configured to cut one or more items that pass through the internal passage.

In at least one example, the waste drain system is disposed within a waste drain line connected to the toilet. In at least one further example, the waste drain system forms the waste drain line. In at least one other example, the waste drain system is disposed within a waste outlet interface of the toilet.

In at least one embodiment, the conduit is coupled to a vacuum generator that is configured to draw the one or more items through the internal passage by vacuum force.

In at least one example, the at least one cutting blade includes a plurality of cutting blades. As a further example, each of the plurality of the cutting blades is opposed by another of the plurality of the cutting blades.

In at least one embodiment, a waste passage extends around the central longitudinal axis. As an example, the one or more cutting blades are outside of the waste passage.

In at least one embodiment, the one or more cutting blades are fixed in position. In at least one other embodiment, the one or more cutting blades are movable. For example, the one or more cutting blades are spring-biased.

In at least one example, the one or more cutting blades are formed on a carrier that is rolled into an annular member and disposed within the conduit.

In at least one example, the conduit and the one or more cutting blades are formed as an insert that is configured to be disposed within one or both of the toilet or a waste drain line connected to the toilet.

Certain embodiments of the present disclosure provide a waste drain method including cutting one or more items flushed down a toilet by one or more cutting blades of a waste drain system that is coupled to or within a waste drain connected to the toilet. In at least one example, the method also includes drawing the one or more items through the waste drain system through vacuum force.

Certain embodiments of the present disclosure provide a vehicle including an internal cabin, a lavatory within the internal cabin (wherein the lavatory includes a toilet), a vacuum generator coupled to the toilet, and a waste drain system coupled to the toilet, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a waste drain system configured for use with a toilet, such as with respect to a lavatory with a vehicle (for example, a commercial aircraft). In at least one embodiment, the waste drain system includes a vacuum toilet waste drain in-line breakdown device that is configured to harvest the energy and velocity from a vacuum toilet system and apply such energy with respect to linear cutting implements (for example, knife blades) within a waste drain line. In at least one embodiment, the knife blades are around an internal periphery of at least a portion of the waste drain line and maintain an unobstructed opening in the middle to allow general waste to pass through without blade engagement. The quantity of knife blades can vary, but can be in even numbers so as to ensure a knife edge is opposed to another, for duel slicing (slashing) of a passing object to reduce the risk of drain blockage. The waste drain systems and methods are configured to breakdown (for example, slash) bulk items that could be potentially flushed down a toilet. Such bulk items include baby diapers and sanitary napkins. The cutting implements slash open outer layers of these items, thereby freeing the inner contents, and reducing the risk of a clogged waste drain line.

Certain embodiments of the present disclosure provide a toilet pipe assembly including tube body defining a passageway, and at least one blade extending at least partially into the passageway for cutting waste flushed down a toilet in a lavatory. The one or more blades can be static/fixed inside the tube body, or movable/flexible to provide a desired amount of compliance.

Figure 1:
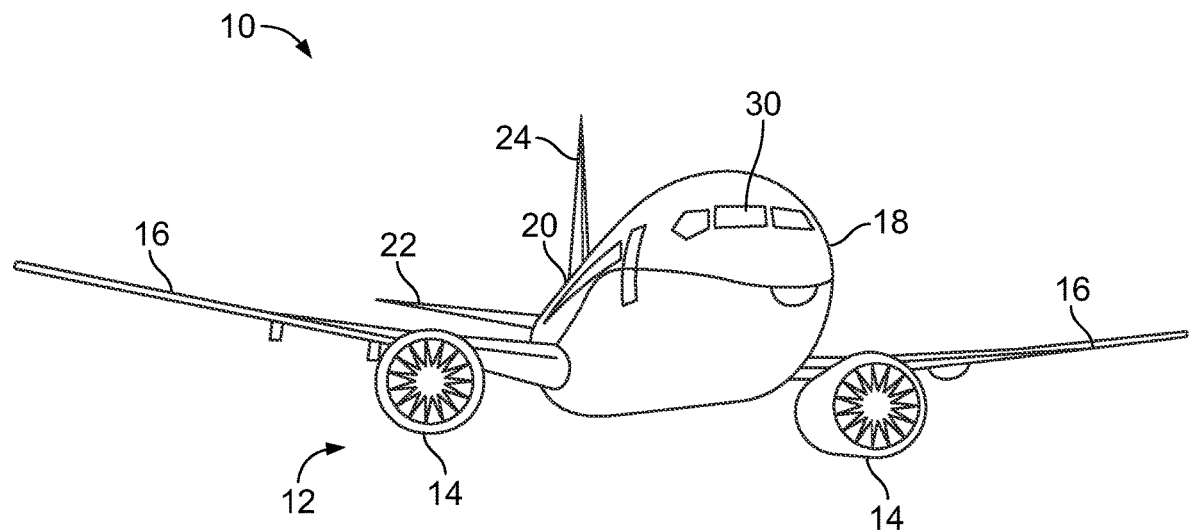
FIG. 1 illustrates a perspective front view of an aircraft, according to an embodiment of the present disclosure.

FIG. 1 illustrates a perspective front view of an aircraft 10, according to an embodiment of the present disclosure. The aircraft 10 includes a propulsion system 12 that includes engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin 30, which includes a flight deck or cockpit, one or more work sections (for example, galleys, personnel carry-on baggage areas, and the like), one or more passenger sections (for example, first class, business class, and coach sections), one or more lavatories, and/or the like.

Alternatively, instead of an aircraft, embodiments of the present disclosure may be used with various other vehicles, such as automobiles, buses, locomotives and train cars, watercraft (such as cruise ships), and the like. Further, embodiments of the present disclosure may be used with respect to fixed structures, such as commercial and residential buildings.

Figure 2:
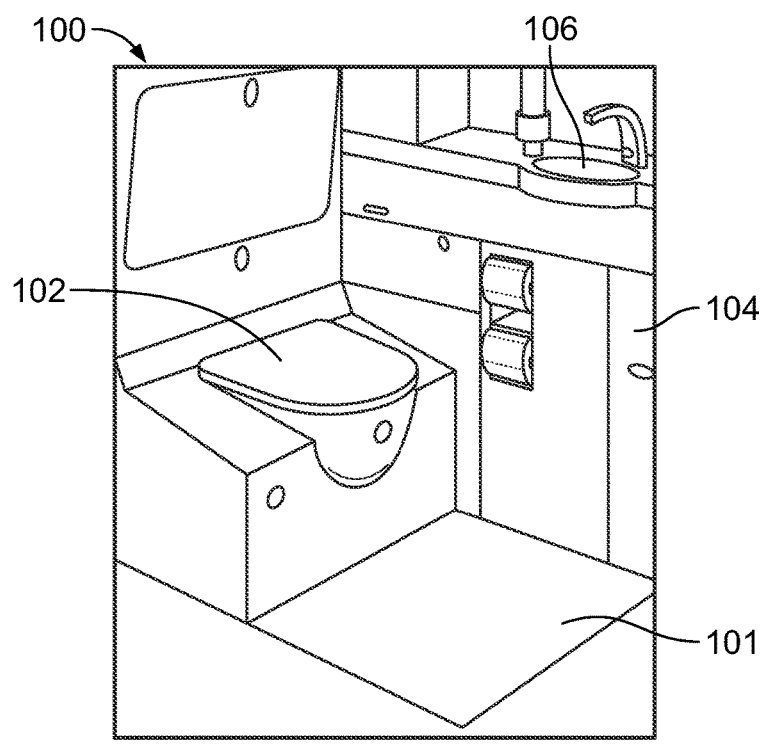
FIG. 2 illustrates a perspective internal view of a lavatory, according to an embodiment of the present disclosure.

FIG. 2 illustrates a perspective internal view of a lavatory 100, according to an embodiment of the present disclosure. The lavatory 100 is an example of an enclosed space or chamber, such as within the internal cabin of the aircraft 10, shown in FIG. 1. The lavatory 100 may be onboard an aircraft, as described above. Optionally, the lavatory 100 may be onboard various other vehicles. In other embodiments, the lavatory 100 may be within a fixed structure, such as a commercial or residential building. The lavatory 100 includes a base floor 101 that supports a toilet 102, one or more cabinets 104, and a sink 106 or wash basin. The lavatory 100 may be arranged differently than shown. The lavatory 100 may include more or less components than shown.

Figure 3:
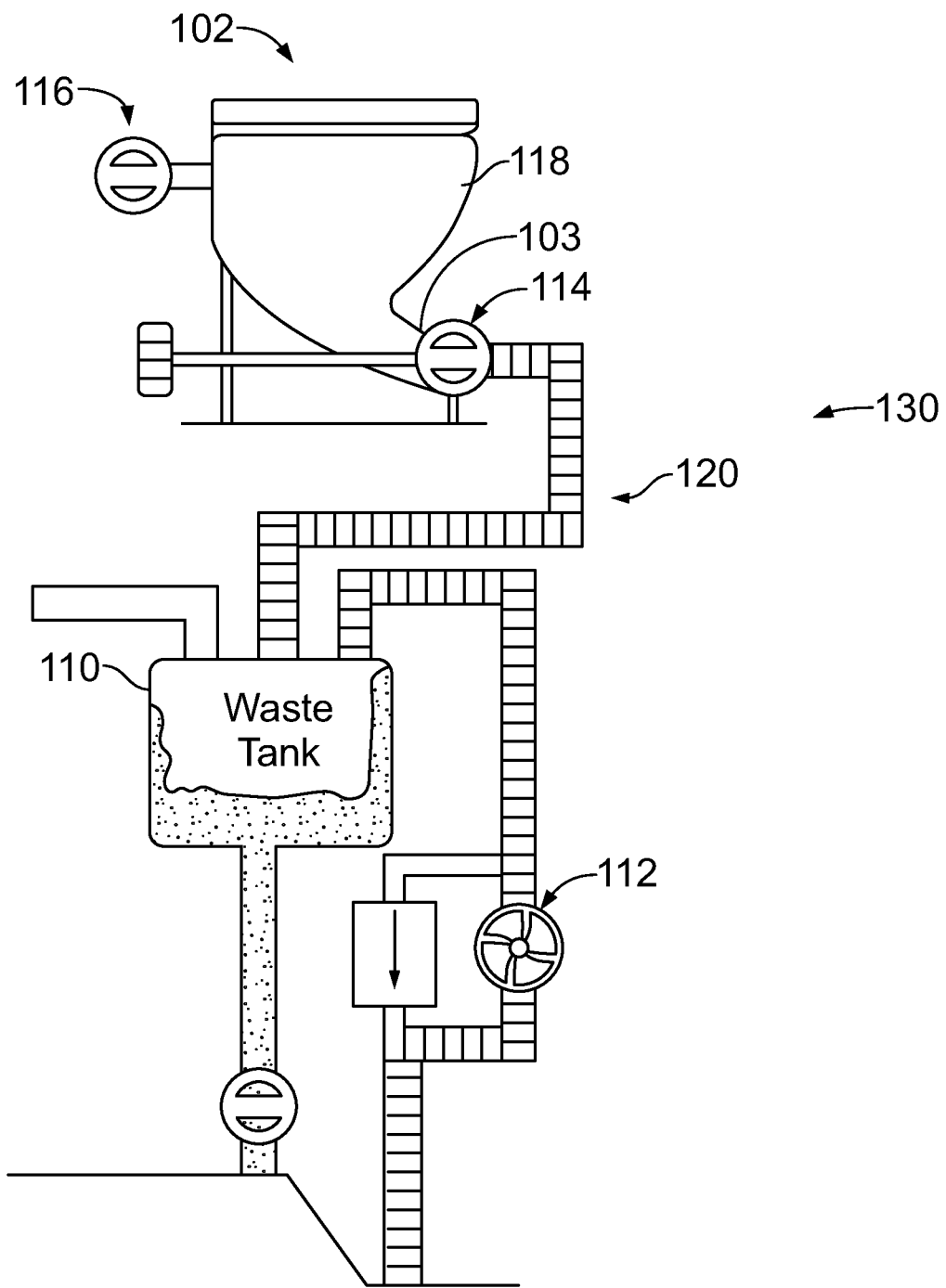
FIG. 3 illustrates a schematic diagram of a toilet connected to a waste tank and a vacuum generator, according to an embodiment of the present disclosure.

FIG. 3 illustrates a schematic diagram of a toilet 102 (such as the toilet 102 shown in FIG. 2) connected to a waste tank 110 and a vacuum generator 112, according to an embodiment of the present disclosure. An actuator 114 configured to activate the vacuum generator 112 can be a flush valve coupled to the toilet 102. The toilet 102 may also include a rinse valve 116 which is activated when a flush button is pressed, for example. When the rinse valve 116 is opened, water from a water source (such as a tank onboard a vehicle) rinses the internal bowl of a housing 118 of the toilet 102. When an individual flushes the toilet 102, the rinse valve 116 and the actuator 114 are opened so that the contents of the internal bowl are drawn into the waste tank 110 through vacuum force generated by the vacuum generator 112.

A waste drain line 120 is disposed between the toilet 102 and the vacuum generator 112. As shown, the waste tank 110 can be disposed within the waste drain line 120. A waste drain system 130 includes one or more cutting blades disposed within at least a portion of the waste drain line 120. For example, a portion of the waste drain line 120, such as at least a portion of a conduit, includes the one or more cutting blades. In at least one embodiment, the waste drain system 130 (for example, a conduit thereof) is coupled to the vacuum generator 112, which is configured to draw one or more items through an internal passage of the waste drain system 130 by vacuum force.

In at least one embodiment, the waste drain system 130 is disposed within the waste drain line 120 connected to the toilet 102. In at least one other embodiment, the waste drain system 130 is disposed within a waste outlet interface 103 of the toilet 102 (for example, the waste drain system 130 can be part of the toilet 102 itself). As another example, the waste drain system 130 is disposed within the waste drain line 120 and the waste outlet interface 103.

Alternatively, the waste drain line 120 may not be coupled to a vacuum generator 112, and/or a waste tank 110. For example, the waste drain 120 can be coupled between a toilet 102 and a sewer, for example.

The configuration shown in FIG. 3 is merely an example. The various components can be arranged differently than shown. Further, additional components, such as various valves, nozzles, liquid separators, and the like may also be included.

Figure 4:
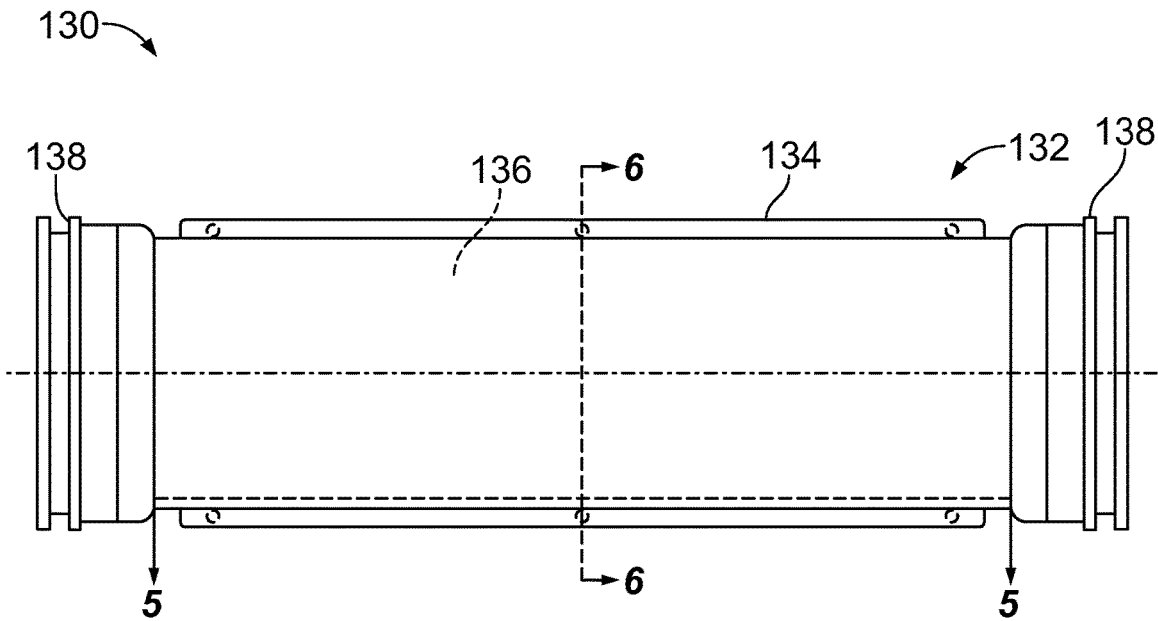
FIG. 4 illustrates a lateral view of a waste drain system, according to an embodiment of the present disclosure.

FIG. 4 illustrates a lateral view of the waste drain system 130, according to an embodiment of the present disclosure. The waste drain system 130 includes a conduit 132, such as a pipe, tube, and/or the like. The conduit 132 includes a main tubular body 134 (or main body) defining an internal passage 136. End couplings 138 are disposed at either end of the main tubular body 134. The end couplings 138 are configured to securely couple the waste drain system 130 to a toilet, such as at a waste drain interface, another segment of a waste drain line (such as another conduit), a vacuum generator, and/or the like. In at least one embodiment, the end couplings 138 can be clamshell connection couplings.

In at least one embodiment, the waste drain system 130 can be a portion of the waste drain line 120 shown in FIG. 3. For example, the waste drain system 130 can be a segment or portion of the waste drain line 120. As a further example, the waste drain system 130 can be a section that extends between 10 inches to 20 inches of the waste drain line 120. Optionally, the waste drain system 130 can be less than 10 inches long or greater than 20 inches long. In at least one embodiment, the waste drain system 130 can form an entirety of the conduit between the toilet 102 and the vacuum generator 112 shown in FIG. 3.

Referring to FIGS. 3 and 4, the waste drain system 130 is coupled directly to the toilet 102 within the waste drain line 120. For example, the waste drain system 130 can be directly coupled to the waste outlet interface 103 of the toilet 102. By disposing the waste drain system 130 as close to the toilet 102 as possible, the waste drain system 130 is able to breakdown (for example, slash open or otherwise cut into smaller pieces) items flushed down the toilet 102 before such items can clog or otherwise block the waste drain line 120. Alternatively, the waste drain system 130 can be disposed within the waste drain line 120 further downstream from the toilet 102, such as 12 inches or more away from the waste outlet interface. In at least one embodiment, the waste drain system 130 can be disposed within the toilet 102, such as within the waste outlet interface 103.

Figure 5:
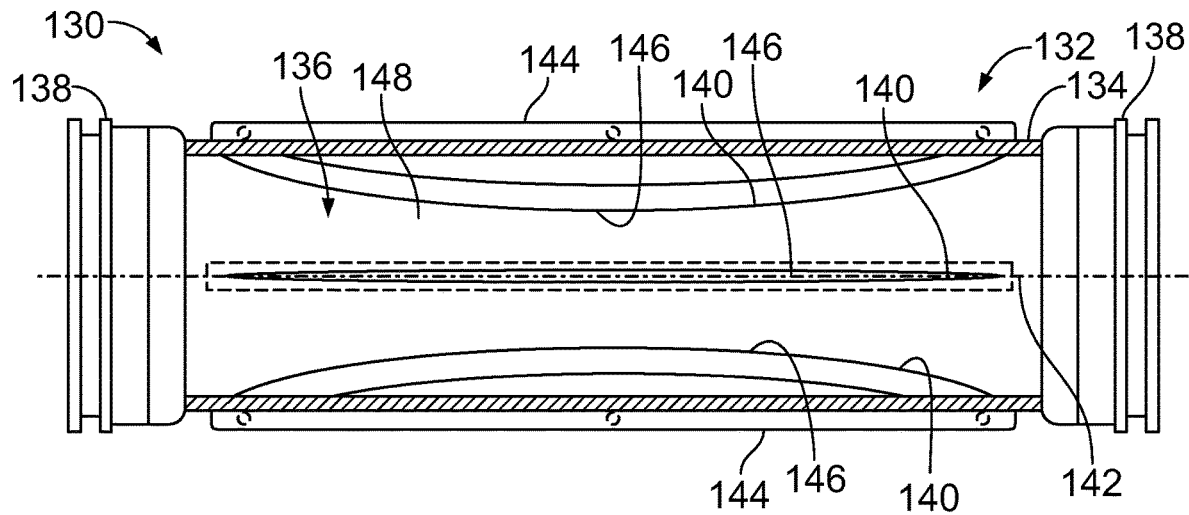
FIG. 5 illustrates a transverse cross-sectional view of the waste drain system through line 5-5 of FIG. 4, according to an embodiment of the present disclosure.

FIG. 5 illustrates a transverse cross-sectional view of the waste drain system 130 through line 5-5 of FIG. 4, according to an embodiment of the present disclosure. The waste drain system 130 includes cutting blades 140 (such as knife blades) that extend radially from the main tubular body 134 toward a central longitudinal axis 142 of the internal passage 136. Each cutting blade 140 can be integrally formed with the main tubular body 134. For example, the cutting blades 140 can be flat, sharp stainless steel razors that are secured to molded plastic brackets 144. Sharp cutting edges 146 of the cutting blades 140 radially and inwardly extend toward the central longitudinal axis 142 from the brackets 144. The sharp cutting edges 146 can be straight. As another example, the sharp cutting edges 146 can be serrated. As another example, the sharp cutting edges 146 can include straight and serrated portions.

As shown, the brackets 144 can radially extend outwardly from the main tubular body 134. Optionally, the brackets 144 can radially extend inwardly from internal surfaces of the main tubular body 134.

In at least one embodiment, the cutting blades 140 do not extend to the central longitudinal axis 142. Instead, a waste passage 148 is defined between the cutting blades 140. The cutting blades 140 are outside of the waste passage 148. The waste passage 148 extends around the central longitudinal axis 142. The waste passage 148 is sized to allow normal, intended waste (such as feces and toilet paper) to pass through the waste drain system 130. The cutting blades 140 can be sized and shaped to cut particular items that are flushed down the toilet 102. For example, the cutting blades 140 are sized and shaped to cut into diapers, large wads of facial or toilet paper, sanitary napkins, and/or the like that can cause clogs in a waste drain line.

Optionally, the cutting blade(s) 140 can extend into and through the waste passage 148. For example, one or more cutting blades 140 can extend across an entire diameter of the internal passage 136.

Figure 6:
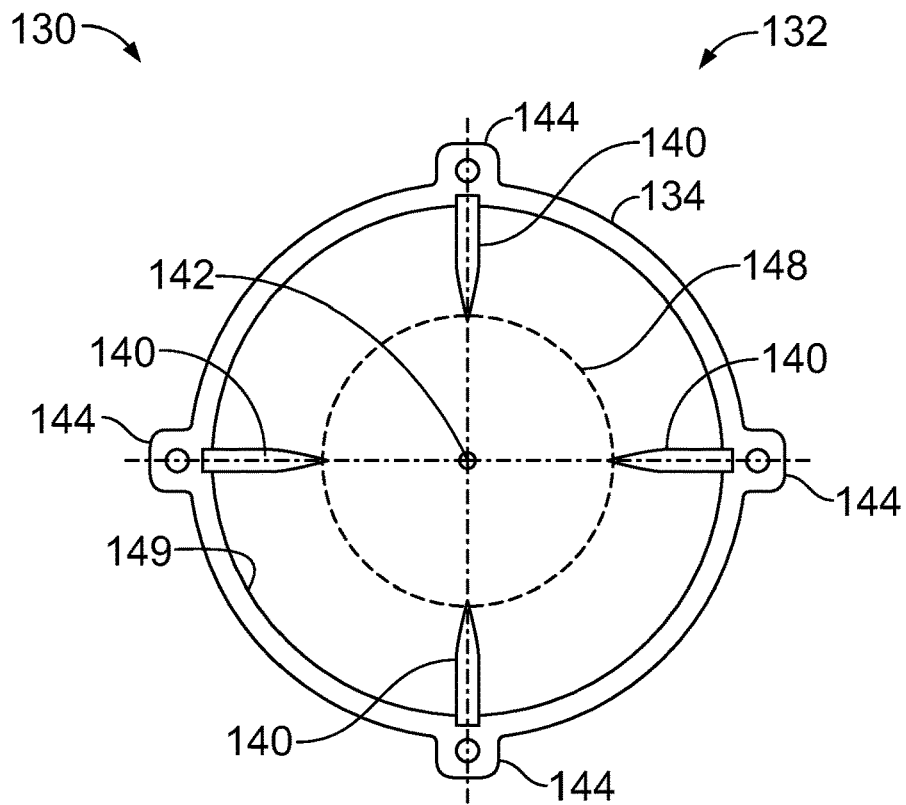
FIG. 6 illustrates an axial cross-sectional view of the waste drain system through line 6-6 of FIG. 4, according to an embodiment of the present disclosure.

FIG. 6 illustrates an axial cross-sectional view of the waste drain system 130 through line 6-6 of FIG. 4, according to an embodiment of the present disclosure. As shown, each cutting blade 140 can be aligned to point toward the central longitudinal axis 142 of the internal passage 136. Optionally, the cutting blades 140 can be angled in relation to such an orientation.

The cutting blades 140 can be fixed in position by the brackets 144. Optionally, the cutting blades 140 can be moveable, such as spring-biased, and configured to pivot back toward the brackets 144 if an item passing through the waste drain system 130 is too large to be broken up by cutting blades 140 that are fixed in position.

As shown, the waste drain system 130 can include four cutting blades 140 regularly spaced around an internal periphery 149 of the main tubular body 134. For example, the cutting blades 140 are positioned at 45 degree increments around the internal periphery 149. As such, each cutting blade 140 is directly opposed by (that is spaced 180 degrees from) another cutting blade 140. The direct opposition of the cutting blades 140 ensures effective and even cutting of items passing through the internal passage 136. Alternatively, one or more of the cutting blades 140 may not be directly opposed by another cutting blade 140. Optionally, the waste drain system 130 can include more or less cutting blades 140 than shown. For example, the waste drain system 130 can include a single cutting blade 140. As another example, the waste drain system 130 can include two cutting blades 140, which may or may not directly oppose one another. As another example, the waste drain system 130 can include three cutting blades 140, two of which may or may not directly oppose one another. As another example, the waste drain system 130 can include five or more cutting blades 140.

Referring to FIGS. 2-4, as the toilet 102 is flushed, the vacuum generator 112 pulls items (including large bulky items that are inadvertently or intentionally flushed, such as diapers, sanitary napkins, and the like) flushed down the toilet 102 through the waste drain line 120. Bulky items having diameters or widths that exceed the waste passage 148 are engaged by the cutting blades 140. The vacuum generator 112 exerts a pulling force on the items through the waste drain line 120. The force exerted by the vacuum generator 112 moves the items between the cutting blades 140, which causes the cutting blades 140 to cut into the items, and thereby breakdown the items. For example, as a diaper moves between the cutting blades 140, the cutting blades 140 cut into the diaper, thereby allowing internal components to spill out. As such, the cutting blades 140 are able to breakdown various items flushed down the toilet, and prevent such items from clogging or otherwise blocking the waste drain line 120.

Figure 7:
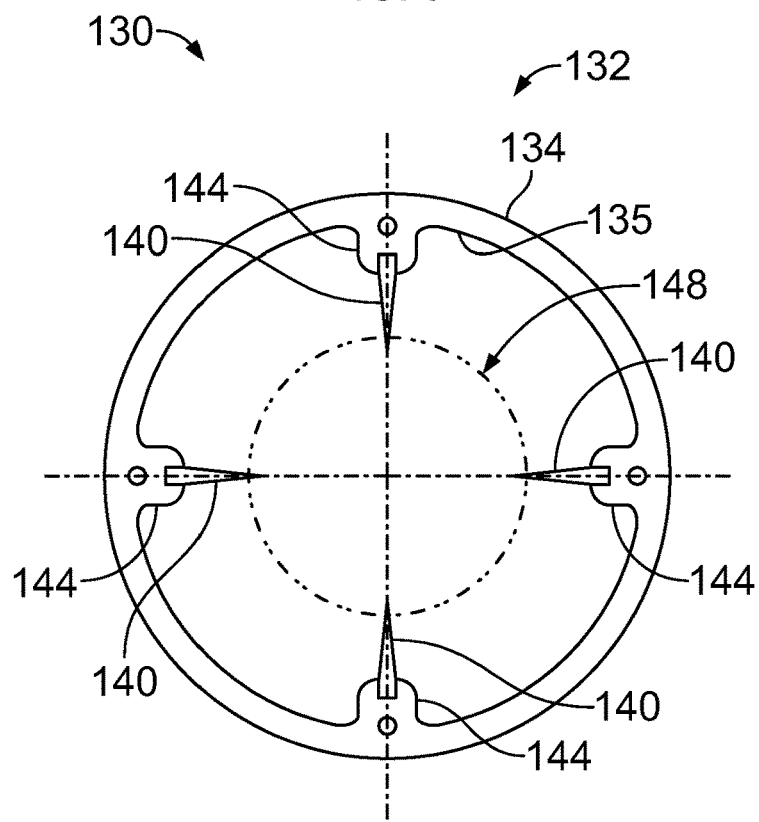
FIG. 7 illustrates an axial cross-sectional view of the waste drain system through line 6-6 of FIG. 4, according to an embodiment of the present disclosure.

FIG. 7 illustrates an axial cross-sectional view of the waste drain system 130 through line 6-6 of FIG. 4, according to an embodiment of the present disclosure. As shown, the brackets 144 can inwardly extend from internal surfaces 135 of the main tubular body 134.

Figure 8:
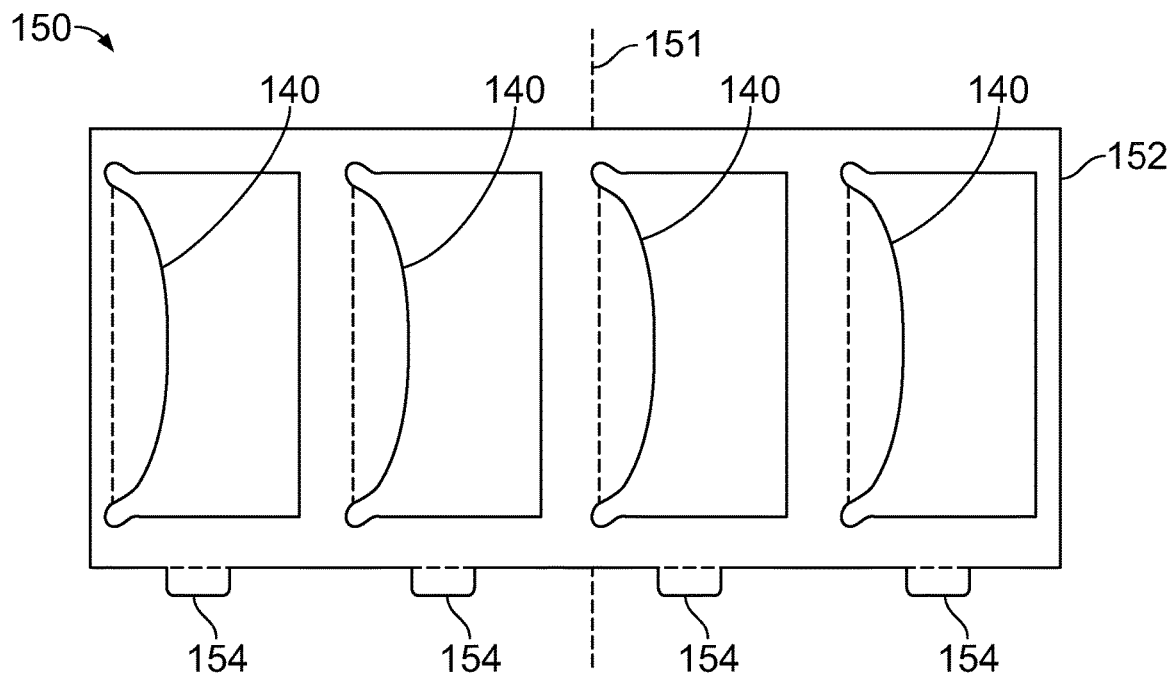
FIG. 8 illustrates a top view (or flat pattern, preformed shape) of a carrier of cutting blades, according to an embodiment of the present disclosure.

FIG. 8 illustrates a top view (or flat pattern, preformed shape) of a carrier 150 of cutting blades 140, according to an embodiment of the present disclosure. The carrier 150 includes an outer frame 152 that retains the cutting blades 140. For example, the carrier 150 can be formed as a flat sheet having the cutting blades 140, which can be formed through a cutting process (such as laser cutting). In at least one embodiment, the cutting blades 140 can be individually removed from the carrier 150 and coupled to the conduit 132, such as via the brackets 144 (shown in FIGS. 4-7), as described herein.

In at least one other embodiment, the carrier 150 can be rolled into an annular member (such as about an axis 151) and inserted into the waste drain line 120 with the cutting blades 140 directed inwardly toward a central longitudinal axis. For example, the carrier 150 can further includes coupling flanges 154 that are configured to be secured into reciprocal recesses formed within the main tubular body 134.

Figures 9, 10:
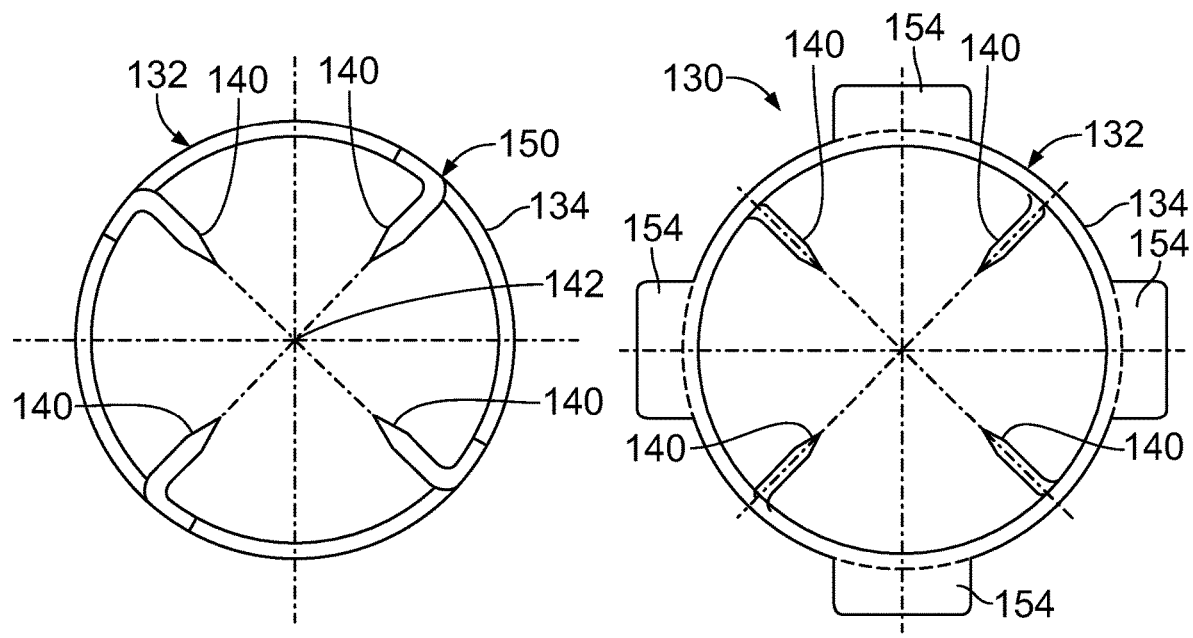
FIG. 9 illustrates an axial cross-sectional view of a main tubular body of a conduit, according to an embodiment of the present disclosure.
FIG. 10 illustrates an end view of a waste drain system (having carrier formed from the flat pattern of FIG. 8), according to an embodiment of the present disclosure.

FIG. 9 illustrates an axial cross-sectional view of the main tubular body 134 of the conduit 132, according to an embodiment of the present disclosure. FIG. 10 illustrates an end view of the waste drain system 130 having the carrier 150, according to an embodiment of the present disclosure. Referring to FIGS. 8-10, the carrier 150 can be rolled into an annular member, such that the cutting blades 140 are bent inwardly. The cutting blades 140 are directed toward the central longitudinal axis 142. The coupling flanges 154 are secured to the main tubular body 134. For example, the coupling flanges 154 can be inserted into recesses or pockets formed in the main tubular body 134. As another example, the coupling flanges 154 can be welded to the main tubular body 134. As another example, the coupling flanges 154 can be secured to the main tubular body 134 via fasteners and/or adhesives. Once installed into the waste drain line 120, the coupling flanges 154 prevent the carrier 150 from being pulled into the system when the vacuum generator 112 is activated during the flush process.

Figure 11:
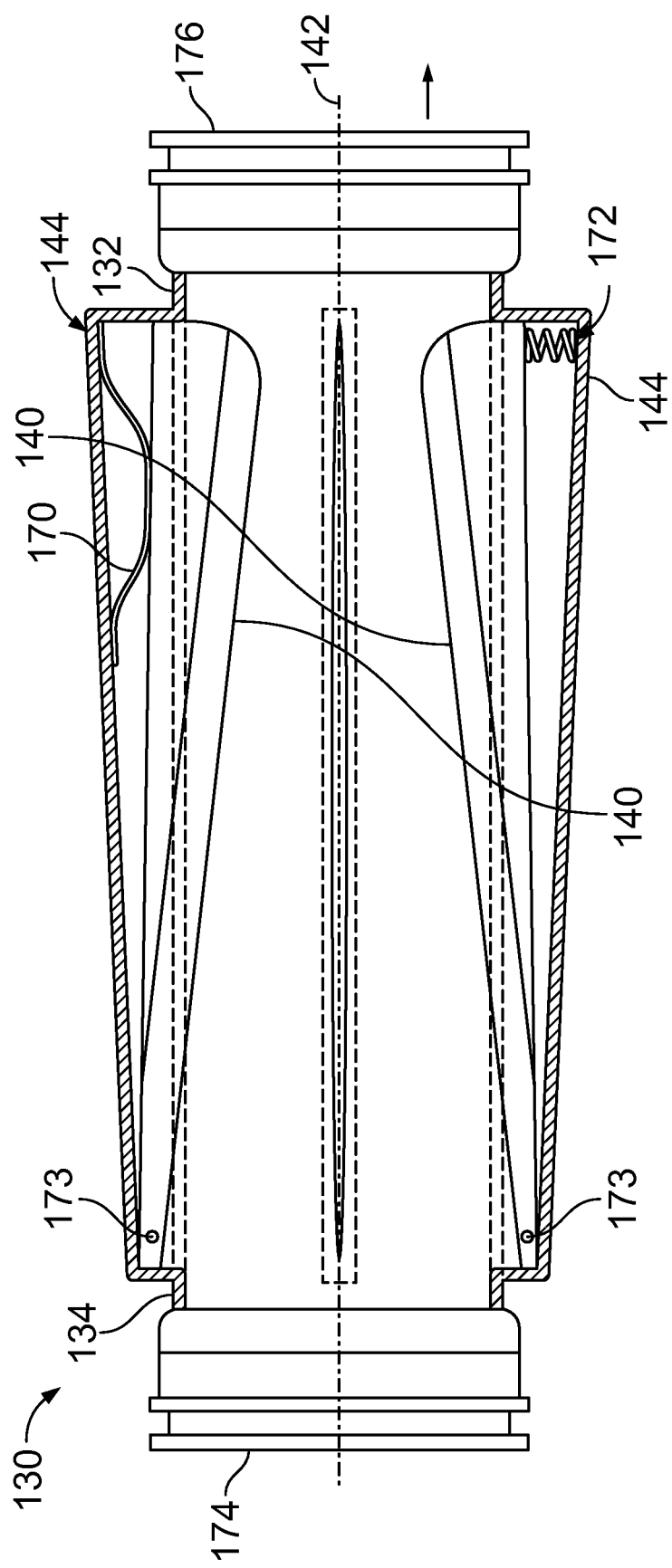
FIG. 11 illustrates a transverse cross-sectional view of a waste drain system, according to an embodiment of the present disclosure.

FIG. 11 illustrates a transverse cross-sectional view of the waste drain system 130, according to an embodiment of the present disclosure. In this embodiment, one or more of the cutting blades 140 can be moveably coupled to a respective bracket 144. As an example, a plate spring 170 can be used to bias a cutting blade 140 toward the central longitudinal axis 142. As another example, a coil spring 172 can be used to bias a cutting blade 140 toward the central longitudinal axis 142. The cutting blades 140 can be pivotally coupled to the brackets 144 at pivot axles 173 proximate an inlet 174 of the waste drain system 130. Waste is configured to flow through the waste drain system 130 from the inlet 174 to the outlet 176, which is opposite from the inlet 174.

The cutting blades 140 are configured to pivot about the pivot axles 173 if an item is too bulky to be cut by blades in their normally biased positions toward the central longitudinal axis 142. That is, if an item is too bulky, the item forces the blades 140 to pivot into the brackets 144 about the pivot axles 173, thereby overcoming the force exerted by the springs 170 or 172. In this manner, the cutting blades 140 are still able to cut into the item, but are movable to ensure that the item does not become stuck between the cutting blades 140.

As shown, the cutting blades 140 can be moveable, such as by being spring-biased, such as via the plate spring 170 and/or the coil spring 172. The plate spring 170 and/or the coil spring 172 can be used with respect to any of the embodiments described herein. As another example, the cutting blades 140 can be movable via other mechanisms, such as bellows, telescoping brackets, resilient brackets (such as formed of an elastomeric material), and/or the like.

Figure 12:
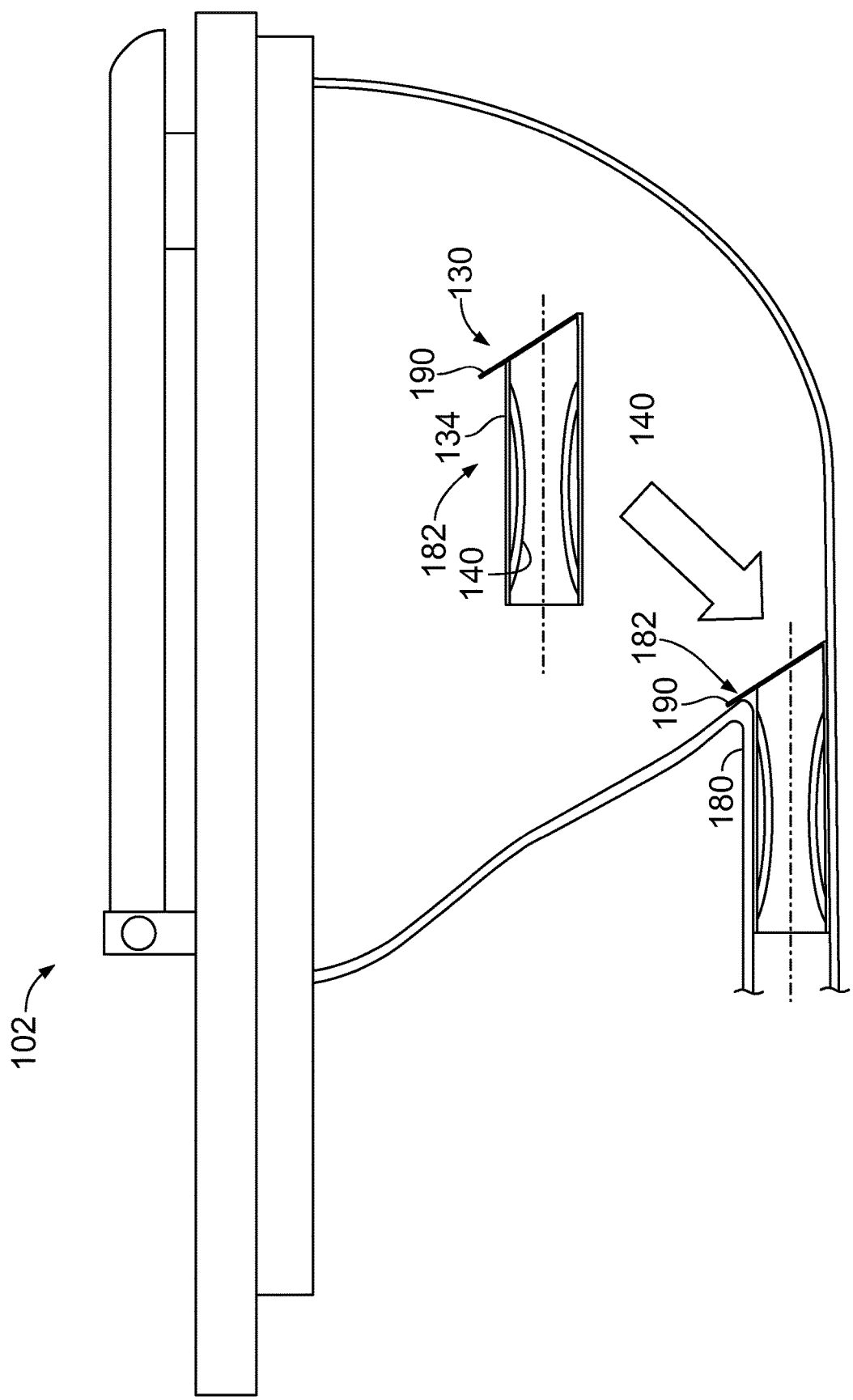
FIG. 12 illustrates an internal view of a toilet, according to an embodiment of the present disclosure.

FIG. 12 illustrates an internal view of a toilet 102, according to an embodiment of the present disclosure. The toilet 102 includes a waste outlet interface 180 that is configured to couple to a waste drain line 120. Optionally, the waste outlet interface 180 forms part of the waste drain line 120. The examples shown and described with respect to FIGS. 8-10 are suited to the configuration shown and described with respect to FIG. 12.

In at least one embodiment, a waste drain system 130, such as those described herein, can be formed as an insert 182 that is inserted into the waste outlet interface 180 (and/or the waste drain line 120). For example, a main tubular body including one or more cutting blades 140, as described herein, can be inserted into the waste outlet interface 180 (and/or the waste drain line 120), instead of being a unitary segment of the waste drain line 120. The insert 182 can be secured to the waste outlet interface 180 (and/or the waste drain line 120) through one or more fasteners, adhesives, integral couplers, and/or the like. The insert 182 can be removably coupled to the waste outlet interface 180 (and/or the waste drain line 120). For example, the insert 182 can be a sleeve that is removably slid into the waste outlet interface 180 (and/or the waste drain line 120), and held in place by a collar 190 having a diameter greater than an internal passage of the waste outlet interface 180 (and/or the waste drain line 120). As another example, the insert 182 can be snapably secured to the waste outlet interface 180 (and/or the waste drain line 120) through one or more detents.

Figure 13:
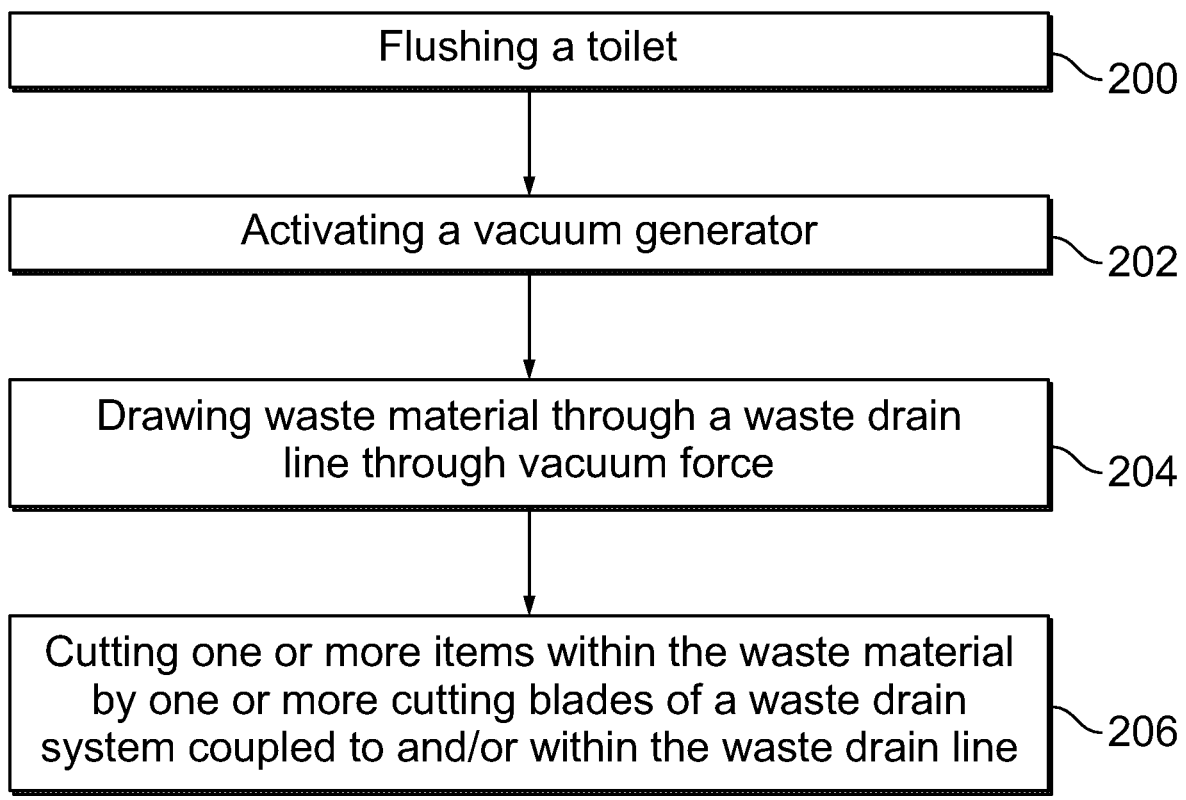
FIG. 13 illustrates a flow chart of a waste drain method, according to an embodiment of the present disclosure.

FIG. 13 illustrates a flow chart of a waste drain method, according to an embodiment of the present disclosure. The method includes: flushing, at 200, a toilet; activating, at 202, a vacuum generator in response to the flushing 200; drawing, at 204, waste material through a waste drain line in response to the activating 202 (such as through vacuum force); and cutting, at 206, one or more items within the waste material by one or more cutting blades of a waste drain system coupled to and/or within the waste drain line.

Referring to FIGS. 1-13, in at least one embodiment, the waste drain systems 130 provide vacuum toilet waste drain in-line breakdown devices configured to harvest the energy and velocity provided from the vacuum generator 112 and apply such energy against a cutting implement, such as one or more cutting blades 140. The cutting blades 140 can be linear knife blades or razors internal to the waste drain line 120, the waste outlet interface 180, and/or the like. The cutting blades 140 are disposed around an internal periphery of the conduit 132, while maintaining an unobstructed opening (that is, the waste opening 148) to allow general waste to pass through without blade engagement. The waste drain systems 130 can include opposed cutting blades 140 to ensure a duel slicing action from both sides of a passing item.

In at least one embodiment, the cutting blades 140 are configured to breakdown (for example, slice and slash) outer layers of items, such as diapers, sanitary napkins, and the like, thereby freeing internal contents (for example, super absorbent polymers) to prevent waste drain line blockages.

The cutting blades 140 can be formed of stainless steel. The cutting blades 140 can be welded to and/or extruded as part of the conduit 132.

The waste drain systems 130 can be removably coupled to the waste drain line 120 and/or the waste outlet interface 180. As such, the waste drain systems 130 can be removed, such as for cleaning, sharpening of the cutting blades 140, and/or the like, or replaced.

Further, the disclosure comprises examples according to the following clauses:

Clause 1. A waste drain system configured to be coupled to a toilet, the waste drain system comprising:
  a conduit including a main body defining an internal passage having a central longitudinal axis; and
  one or more cutting blades extending from the main body toward the central longitudinal axis, wherein the one or more cutting blades are configured to cut one or more items that pass through the internal passage.

Clause 2. The waste drain system of Clause 1, wherein the waste drain system is disposed within a waste drain line connected to the toilet.

Clause 3. The waste drain system of Clause 2, wherein the waste drain system forms the waste drain line.

Clause 4. The waste drain system of Clause 1, wherein the waste drain system is disposed within a waste outlet interface of the toilet.

Clause 5. The waste drain system of any of Clauses 1-4, wherein the conduit is coupled to a vacuum generator that is configured to draw the one or more items through the internal passage by vacuum force.

Clause 6. The waste drain system of any of Clauses 1-5, wherein the at least one cutting blade comprises a plurality of cutting blades.

Clause 7. The waste drain system of Clause 6, wherein each of the plurality of the cutting blades is opposed by another of the plurality of the cutting blades.

Clause 8. The waste drain system of any of Clauses 1-7, wherein a waste passage extends around the central longitudinal axis.

Clause 9. The waste drain system of Clause 8, wherein the one or more cutting blades are outside of the waste passage.

Clause 10. The waste drain system of any of Clauses 1-9, wherein the one or more cutting blades are fixed in position.

Clause 11. The waste drain system of any of Clauses 1-9, wherein the one or more cutting blades are movable.

Clause 12. The waste drain system of Clause 11, wherein the one or more cutting blades are spring-biased.

Clause 13. The waste drain system of any of Clauses 1-12, wherein the one or more cutting blades are formed on a carrier that is rolled into an annular member and disposed within the conduit.

Clause 14. The waste drain system of any of Clauses 1-13, wherein the conduit and the one or more cutting blades are formed as an insert that is configured to be disposed within one or both of the toilet or a waste drain line connected to the toilet.

Clause 15. A waste drain method, comprising:
cutting one or more items flushed down a toilet by one or more cutting blades of a waste drain system that is coupled to or within a waste drain connected to the toilet.

Clause 16. The waste drain method of Clause 15, further comprising drawing the one or more items through the waste drain system through vacuum force.

Clause 17. A vehicle comprising:
an internal cabin;
a lavatory within the internal cabin, wherein the lavatory comprises a toilet;
a vacuum generator coupled to the toilet; and
a waste drain system coupled to the toilet, the waste drain system comprising:
  a conduit including a main body defining an internal passage having a central longitudinal axis, wherein a waste passage extends around the central longitudinal axis, and wherein the conduit is coupled to the vacuum generator; and
  one or more cutting blades extending from the main body toward the central longitudinal axis, wherein the one or more cutting blades are outside of the waste passage, wherein the one or more cutting blades are configured to cut one or more items that pass through the internal passage, and wherein the vacuum generator is configured to draw the one or more items through the internal passage by vacuum force.

Clause 18. The vehicle of Clause 17, wherein the waste drain system is disposed in one or both of a waste drain line connected to the toilet, or a waste outlet interface of the toilet.

Clause 19. The vehicle of Clauses 17 or 18, wherein the at least one cutting blade comprises a plurality of cutting blades, and wherein each of the plurality of the cutting blades is opposed by another of the plurality of the cutting blades.

Clause 20. The vehicle of any of Clauses 17-19, wherein the one or more cutting blades are movable.

As described herein, embodiments of the present disclosure provide systems and methods for reducing a risk of waste drain blockages. Further, embodiments of the present disclosure provide systems and methods that reduce a possibility of a toilet blockage disrupting a flight of a commercial aircraft, or lavatory services provided on a cruise ship, for example.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A waste drain system configured to be coupled to a toilet, the waste drain system comprising:
   a conduit configured to be outside of a bowl of the toilet, the conduit including a main body defining an internal passage having a central longitudinal axis; and
   one or more cutting blades within the conduit, the one or more cutting blades extending from the main body toward the central longitudinal axis, wherein the one or more cutting blades are configured to cut one or more items that pass through the internal passage.

2. The waste drain system of claim 1, wherein the waste drain system is disposed within a waste drain line connected to the toilet.

3. The waste drain system of claim 2, wherein the waste drain system forms the waste drain line.

4. The waste drain system of claim 1, wherein the waste drain system is disposed within a waste outlet interface coupled to the toilet.

5. The waste drain system of claim 1, wherein the conduit is coupled to a vacuum generator that is configured to draw the one or more items through the internal passage by vacuum force.

6. The waste drain system of claim 1, wherein the at least one cutting blade comprises a plurality of cutting blades.

7. The waste drain system of claim 6, wherein each of the plurality of the cutting blades is opposed by another of the plurality of the cutting blades.

8. The waste drain system of claim 1, wherein a waste passage extends around the central longitudinal axis.

9. The waste drain system of claim 8, wherein the one or more cutting blades are outside of the waste passage.

10. The waste drain system of claim 1, wherein the one or more cutting blades are fixed in position.

11. The waste drain system of claim 1, wherein the one or more cutting blades are movable.

12. The waste drain system of claim 11, wherein the one or more cutting blades are spring-biased.

13. The waste drain system of claim 1, wherein the one or more cutting blades are formed on a carrier that is rolled into an annular member and disposed within the conduit.

14. The waste drain system of claim 1, wherein the conduit and the one or more cutting blades are formed as an insert that is configured to be disposed within one or both of the toilet or a waste drain line connected to the toilet.

15. A waste drain method, comprising:
    cutting one or more items flushed down a toilet by one or more cutting blades of a waste drain system that is coupled to or within a waste drain connected to and outside of a bowl of the toilet.

16. The waste drain method of claim 15, further comprising drawing the one or more items through the waste drain system through vacuum force.

17. A vehicle comprising:
    an internal cabin;
    a lavatory within the internal cabin, wherein the lavatory comprises a toilet;
    a vacuum generator coupled to the toilet; and
    a waste drain system coupled to the toilet, the waste drain system comprising:
       a conduit outside of a bowl of the toilet, the conduit including a main body defining an internal passage having a central longitudinal axis, wherein a waste passage extends around the central longitudinal axis, and wherein the conduit is coupled to the vacuum generator; and
       one or more cutting blades within the conduit, the one or more cutting blades extending from the main body toward the central longitudinal axis, wherein the one or more cutting blades are outside of the waste passage, wherein the one or more cutting blades are configured to cut one or more items that pass through the internal passage, and wherein the vacuum generator is configured to draw the one or more items through the internal passage by vacuum force.

18. The vehicle of claim 17, wherein the waste drain system is disposed in one or both of a waste drain line connected to the toilet, or a waste outlet interface coupled to the toilet.

19. The vehicle of claim 17, wherein the at least one cutting blade comprises a plurality of cutting blades, and wherein each of the plurality of the cutting blades is opposed by another of the plurality of the cutting blades.

20. The vehicle of claim 17, wherein the one or more cutting blades are movable.

* * * * *